(12) United States Patent
Muthuswamy et al.

(10) Patent No.: US 11,687,940 B2
(45) Date of Patent: Jun. 27, 2023

(54) OVERRIDE PROCESS IN DATA ANALYTICS PROCESSING IN RISK NETWORKS

(71) Applicant: International Business Machines Corporation, Armonk, NY (US)

(72) Inventors: Srinivasan S. Muthuswamy, Bangalore (IN); Subhendu Das, Chapel Hill, NC (US); Mukesh Kumar, Bangalore (IN); Shweta Shandilya, Bangalore (IN); Willie Robert Patten, Jr., Hurdle Mills, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/178,967

(22) Filed: Feb. 18, 2021

(65) Prior Publication Data
US 2022/0261247 A1 Aug. 18, 2022

(51) Int. Cl.
*G06Q 20/40* (2012.01)

(52) U.S. Cl.
CPC ................ *G06Q 20/4016* (2013.01)

(58) Field of Classification Search
None
See application file for complete search history.

(56) References Cited

U.S. PATENT DOCUMENTS

| | | | |
|---|---|---|---|
| 7,562,814 B1 | 7/2009 | Shao et al. | |
| 7,984,021 B2 * | 7/2011 | Bhide | G06F 16/2358 707/662 |
| 10,140,615 B2 | 11/2018 | Carpenter et al. | |
| 10,140,623 B1 | 11/2018 | Lloyd et al. | |
| 2008/0103800 A1 * | 5/2008 | Domenikos | G06Q 40/02 705/318 |
| 2014/0089193 A1 | 3/2014 | Boding et al. | |
| 2016/0086185 A1 * | 3/2016 | Adjaoute | G06Q 20/4016 705/44 |
| 2018/0150843 A1 * | 5/2018 | Adjaoute | G06N 20/00 |

(Continued)

OTHER PUBLICATIONS

Kaur, H., et al., "Deep Learning in Smart Farming—Concepts, Applications and Techniques", Think India Journal, Aug. 2019, 13 pages, vol. 22, Issue 16.

(Continued)

*Primary Examiner* — Bruce I Ebersman
*Assistant Examiner* — Matthew Cobb
(74) *Attorney, Agent, or Firm* — Scully, Scott, Murphy & Presser, P.C.

(57) ABSTRACT

A computer-implemented system, method and computer program product for preparing alert reports that includes: receiving an override request to override an insight used to prepare the alert reports; determining, determining one or more execution pipelines used to prepare the alert reports that used the insight that is the subject of the override request; determining one or more impacted pipeline runs that were executed to prepare the alert reports that used the insight that is the subject of the override request; updating the one or more execution pipelines used to prepare the alert reports; and generating new alert reports, wherein generating the new alert reports comprises re-running the one or more impacted pipeline runs using the one or more updated execution pipelines wherein the insight that is the subject of the override request is overridden.

20 Claims, 7 Drawing Sheets

(56) References Cited

U.S. PATENT DOCUMENTS

2019/0228419 A1\* 7/2019 Sampath ................. G06F 18/22
2020/0005310 A1   1/2020 Kumar et al.
2020/0402058 A1\* 12/2020 Zhou .................... G06Q 20/385
2021/0004810 A1\* 1/2021 Lind .................... G06V 30/413

OTHER PUBLICATIONS

McDonald, A., et al., "Credit Risk Rating at Australian Banks", Working Paper 7, Dec. 2000, 34 pages.
Whiting, D. G., et al, "Machine Learning Methods for Detecting Patterns of Management Fraud", Computational Intelligence, 2012, 23 pages, vol. 0, No. 0.

\* cited by examiner

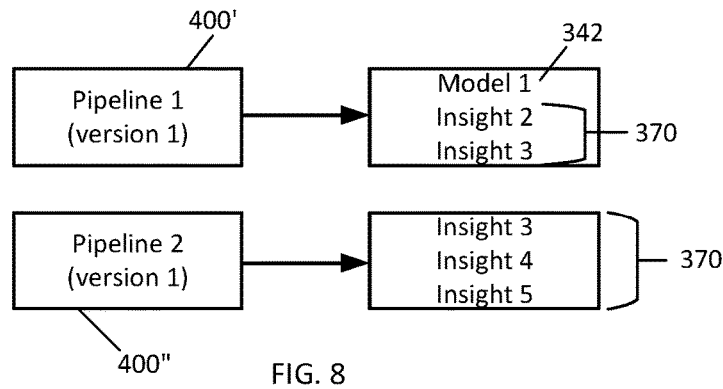
FIG. 8
| # | Scenarios | Insight | Pipeline | run | data | data sub set |
|---|---|---|---|---|---|---|
| | user provided inputs | | identified by the system | | | |
| 1 | User selects override just for Alert 1 | Insight 1 | Pipeline1 | run1 | data1 | data 1 filtered for claim 1 |
| 2 | User selects override for Alert 1, Alert 2, Alert 3 | Insight 1 | Pipeline1 | run1 | data1 | data1 |
| 3 | User selects override for all alerts: Alert [1-6] | Insight 3 | Pipeline1, Pipeline2 | run1 | data 1, data 2 | data 1 and data 2 |
FIG. 9
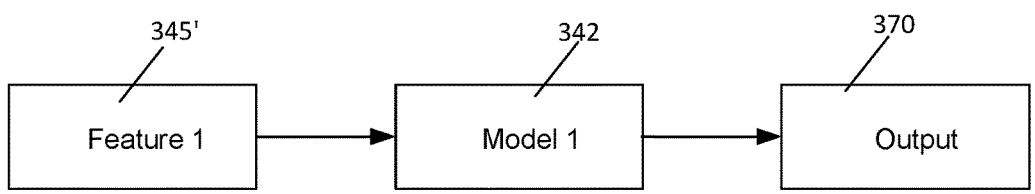
FIG. 10
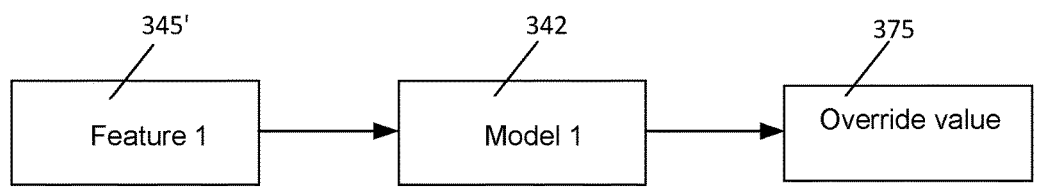
FIG. 11

OVERRIDE PROCESS IN DATA ANALYTICS PROCESSING IN RISK NETWORKS

FIELD

The present application relates generally to information handling and/or data processing and analytics, and more particularly to methods, computer systems, and computer program products for detecting fraudulent activities, risk-by-association analysis and/or suspicious activities.

BACKGROUND

There is a regulatory need for monitoring financial transactions and activity of account holders at financial institutions and monitoring insurance claims to detect any fraudulent, suspicious, or criminal activity such as, for example, money laundering, and/or insurance claim fraud. Governmental anti-money laundering (AML) and other regulations may require a financial institution to monitor for activities and behavior indicative of criminal or fraudulent activity. Detecting activity indicative of fraudulent or criminal activity is increasingly difficult due to the large amount of data and information, such as, for example, numerous financial transactions, and numerous parties/entities.

There have been developed electronic systems and data analytical processes to detect activity indicative of fraud, criminal behavior, and other suspicious activity. These advanced information and data processing systems discover, define, and detect data patterns within relationship networks, for example, a large scale network of financial transactions, insurance claims, and the like involving numerous parties and transactions, that are indicative of suspicious activity and behavior.

In the financial crime scenario, the electronic systems and data analytical processes create alerts that are often reviewed by analysts and managers, each having different roles in the analysis and vetting process. In typical scenarios, new data is imported into the electronic data analytics system, for example a day's financial transactions, and electronic analytical processes are run for example on all the data, old and new data, and the electronic data analytics system generates alerts. The alerts can take many forms and generally will flag a person or incident that is suspicious and might require further review and analysis. The alert goes to a case manager who reviews the alert, and if the alert is credible, then it might be investigated by an internal team, and if the internal team finds the alert credible then it will prepare a suspicious activity report (SARs).

During the review process, the user (for example, the analyst or supervisor) might identify that a given insight and/or event that formed part of the basis for the alert is invalid or misleading in the given context, or can identify an insight and/or event as not relevant. In such a case, under current systems, re-accessing the alert without the invalid, misleading, or irrelevant insight is handled manually and/or requires a development cycle to make changes to the fraud detection analysis and then re-run the analytical process through the electronic data analytics system again, e.g., redeploy the fraud detection pipeline with the changes. This reanalysis generally involves rerunning the data through the revised fraud detection pipeline, or manually processing the analytics, and is time consuming and cumbersome.

SUMMARY

The summary of the disclosure is given to aid understanding of, and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, the architectural structure, and their method of operation to achieve different effects. In this regard it will be appreciated that the disclosure presents and describes one or more inventions, and in aspects includes numerous inventions as defined by the claims.

A system and/or method is disclosed for preparing alert reports that includes: receiving an override request to override an insight used to prepare one or more alert reports; determining, in response to receiving a request to override an insight used to prepare one or more alert reports, one or more execution pipelines used to prepare the one or more alert reports that used the insight that is the subject of the override request; determining, in response to receiving a request to override an insight used to prepare one or more alert reports, one or more impacted pipeline runs that were executed to prepare the one or more alert reports that used the insight that is the subject of the override request; updating the one or more execution pipelines used to prepare the one or more alert reports; and generating one or more new alert reports, wherein generating one or more new alert reports comprises re-running the one or more impacted pipeline runs using the one or more updated execution pipelines wherein the insight that is the subject of the override request is overridden.

In an aspect, determining the one or more execution pipelines used to prepare the one or more alert reports comprises identifying one or more impacted models used to generate the insight that is the subject of the override request. Typically, updating the one or more execution pipelines used to prepare the particular alert report further includes setting an override flag for the one or more impacted models used to generate the insight that is the subject of the override request and that was used in the one or more execution pipelines used to prepare the one or more alert reports. In an embodiment, in response to setting an override flag for the one or more impacted models, an override value is output by at least one of the one or more impacted models when generating the one or more new alert reports. The request to override an insight can be directed to a single alert report, multiple alert reports, or all alert reports that utilized the insight. In an aspect, the request to override the insight used to prepare multiple or all the alert reports can only be requested by a user having higher privilege authority than a user that made the request to override the insight used to prepare the particular report.

In one or more embodiments, a computer-implemented system to generate one or more alert reports and/or a non-transitory computer readable medium comprising instructions that, when executed by at least one hardware processor, configure the at least one hardware processor to generate report alert reports is disclosed. The system includes: a memory storage device storing program instructions; and a hardware processor having circuitry and logic to execute said program instructions to prepare the one or more alert reports, the hardware processor coupled to said memory storage device and in response to executing said program instructions, is configured to: receive an override request to override an insight used to prepare the one or more alert reports; determine one or more execution pipelines used to prepare the one or more alert reports that used the insight that is the subject of the override request, wherein determining the one or more execution pipelines comprises identifying one or more impacted models used to generate the insight that is the subject of the override request; update the one or more execution pipelines used to prepare the one or more alert reports; determine the one or more impacted pipeline runs that were executed to prepare the one or more alert reports that used the insight that is the subject of the override request; and generate one or more new alert reports, wherein generating the one or more new alert reports comprises re-running the one or more impacted pipeline runs using the one or more updated execution pipelines wherein the one or more identified, impacted models used to generate the insight that is the subject of the override request are overridden.

The foregoing and other objects, features, and/or advantages of the invention will be apparent from the following more particular descriptions and exemplary embodiments of the invention as illustrated in the accompanying drawings wherein like reference numbers generally represent like parts of the illustrative embodiments of the invention.

BRIEF DESCRIPTION OF THE DRAWINGS

The various aspects, features, and embodiments of a system and/or method to override insights and/or events in a fraud detection electronic data analysis system will be better understood when read in conjunction with the figures provided. Embodiments are provided in the figures for the purpose of illustrating aspects, features, and/or various embodiments of the systems and methods, but the claims should not be limited to the precise arrangement, structures, features, aspects, systems, platforms, modules, functional units, assemblies, subassemblies, systems, circuitry, embodiments, methods, processes, techniques, and/or devices shown, and the arrangements, structures, systems, platforms, modules, functional units, assemblies, subassemblies, features, aspects, methods, processes, techniques, circuitry, embodiments, and devices shown may be used singularly or in combination with other arrangements, structures, assemblies, subassemblies, systems, platforms, modules, functional units, features, aspects, circuitry, embodiments, methods, techniques, processes, and/or devices.

FIG. 8 diagrammatically illustrates impacted models in execution pipelines identified for override;

FIG. 9 is a table illustrating the user inputs and system identifications for various override scenarios in a system and/or process to rerun alert reports;

FIG. 10 illustrates a portion of an execution pipeline undergoing a normal run;

FIG. 11 illustrates a portion an execution pipeline where a model has been flagged to be overridden;

DETAILED DESCRIPTION

The following description is made for illustrating the general principles of the invention and is not meant to limit the inventive concepts claimed herein. In the following detailed description, numerous details are set forth in order to provide an understanding of the system, method, and/or techniques for overriding an insight and/or event in a data analytics model for detecting fraud or other suspicious activity, however, it will be understood by those skilled in the art that different and numerous embodiments of the system and its method of operation may be practiced without those specific details, and the claims and disclosure should not be limited to the arrangements, structures, systems, assemblies, subassemblies, platforms, modules, functional units, circuitry, embodiments, features, aspects, processes, methods, techniques, and/or details specifically described and shown herein. Further, particular features, aspects, arrangements, structures, systems, assemblies, subassemblies, platforms, modules, functional units, circuitry, embodiments, methods, processes, techniques, details, etc. described herein can be used in combination with other described features, aspects, arrangements, structures, systems, assemblies, subassemblies, platforms, modules, functional units, circuitry, embodiments, techniques, methods, processes, details, etc. in each of the various possible combinations and permutations.

The following discussion omits or only briefly describes conventional features of information processing systems and data networks, including electronic data analytics programs or electronic risk assessment tools configured and adapted to detect suspicious activity and generate alerts in connection with, for example, financial and/or insurance claim transactions, which should be apparent to those skilled in the art. It is assumed that those skilled in the art are familiar with data processing and data analytics including large scale data processing/analytics (also referred to as information/data processing systems) and their operation, and the application of data analytics, including data analytics systems and processes to detect suspicious activity that may be indicative of fraud and/or other criminal behavior. It may be noted that a numbered element is numbered according to the figure in which the element is introduced, and is typically referred to by that number throughout succeeding figures.

Figure 1:
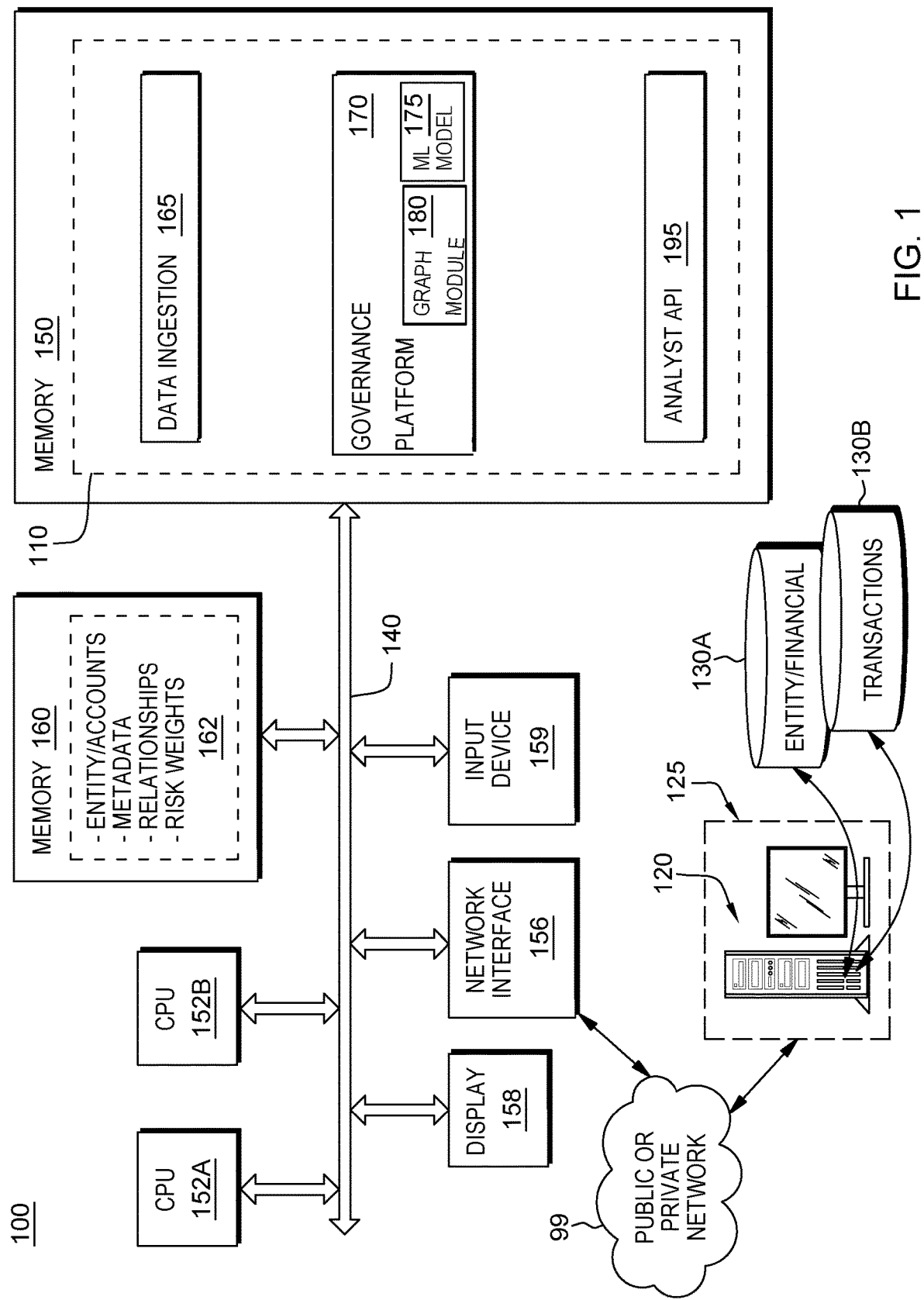
FIG. 1 schematically shows an exemplary computer system/computing device which is applicable to implement one or more embodiments of the suspicious activity and risk assessment tool of the present disclosure.

FIG. 1 illustrates an embodiment computer system functioning as an electronic risk assessment tool 100 implementing methods to more accurately detect suspicious activity in the domain of financial services, insurance claims processing, and related industries, e.g., insurance claim fraud and money laundering fraud detection. In embodiments, such a system tool 100 may be employed by or for a bank or insurance company who may issue, or a regulatory authority who may receive, a suspicious activity report (SAR) concerning a particular party, organization, and/or transaction(s). The SAR may be issued by a bank against an entity or party who has been found to participate in suspicious activity, e.g., the bank has found suspicious activity undertaken by a given party, and reports this to the concerned authorities. In insurance fraud, a "suspicious" entity may be a doctor, auto body shop, a claimant, or any party who may be placed on a "watch" list.

In the context of detecting financial fraud, e.g., money laundering, and/or insurance claim fraud, according to one embodiment, risk assessment tool 100 is a computer system, a computing device, a mobile device, or a server configured to run risk assessment software applications and models. In some aspects, computing device 100 may include, for example, personal computers, laptops, tablets, smart devices, smart phones, or any other similar computing device, an embodiment of which is described in more detail in FIG. 13.

Computing system 100 includes one or more hardware processors 152A, 152B (also referred to as central processing units (CPUs), a memory 150, e.g., for storing an operating system, application program interfaces (APIs) and program instructions, a network interface 156, a display device 158, an input device 159, and any other features common to a computing device. In some aspects, computing system 100 may, for example, be any computing device that is configured to communicate with one or more web-sites 125 including a web-based or cloud-based server 120 over a public or private communications network 99. For instance, a web-site may include a financial institution that records/stores information, e.g., multiple financial transactions occurring between numerous parties (entities) and electronic transactions. Such electronic transactions may be stored in a database 130B with associated financial and entity information stored in related database 130A. Further, as shown as part of system 100, there can be a local memory and/or an attached memory storage device 160, or a remote memory storage device, e.g., a database, accessible via a remote network connection for input to the system 100.

In the embodiment depicted in FIG. 1, processors 152A, 152B may include, for example, a microcontroller, Field Programmable Gate Array (FPGA), or any other processor that is configured to perform various operations. Communication channels 140, e.g., wired connections such as data bus lines, address bus lines, Input/Output (I/O) data lines, video bus, expansion busses, etc., are shown for routing signals between the various components of system 100. Processors 152A, 152B are configured to execute instructions as described below. These instructions may be stored, for example, as programmed modules in an associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100.

With respect to configuring the computer system as a risk assessment tool 100 for detecting suspicious activity, e.g., financial fraud, and creating alerts, the local or remote memory 160 may be configured for storing information and associated meta-data. Such captured and stored data can include but is not limited to: parties, accounts, transactions, relationships, and associated metadata obtained from transactions and data stored in the electronic databases 130A, 130B. Alternately or in addition, the entity data, entity relationships, transactional data and meta-data 162 can be stored in a separate local memory storage device attached to the computer system 100.

Memory 150 of computer system 100 in one or more embodiments stores processing modules that include programmed instructions adapted to perform risk assessment as it relates to detecting suspicious activity, e.g., financial fraud, money laundering, insurance fraud, and creating alerts or SARs.

In an embodiment, one of the programmed processing modules stored at the associated memory 150 include a data ingestion module 165 that provides instructions and logic for operating circuitry to access/read large amounts of data (e.g., parties, accounts, transactions data) for use by other modules that process and analyze the data to form and output alerts. In one or more embodiments, the input data for data ingestion module 165 comprises parties, accounts, transactions, etc. For example, where a financial institution, such as for example a bank, desires to determine if there is a money laundering scheme or other fraud, for example as a result of governmental oversight, or regulations, such as for example anti-money laundering (AML) laws, the input data can comprise: the transactions occurring with or being processed by the financial institution; the parties to any financial transaction with or through the financial institution; and account information (the customers) of the financial institution. In the case of an insurance organization and the like, the input data can comprise: the parties doing business with the insurance organization; the claims made with the insurance organization; policy information (the customers) of the insurance organization, the identity of any agencies or brokers that were involved in underwriting the policy, and any parties involved in treating the claim, e.g., auto body shop fixing the motor vehicle, physician treating patient, etc. The examples above are not limiting and there can be other situations where the system will have application, and additional or other input data can be provided.

In an embodiment, memory 150 includes a Analytics and Governance Platform 170 that provides instructions and logic for operating circuitry to process and analyze data, typically large amounts of data, to form and output alerts. Analytics and Governance Platform 170 (also referred to as Governance Platform 170, Platform 170, or module 170) preferably contains one or more models to determine a fraud risk probability based on the variables, and/or data. Based on the data and the models, alerts and/or SARs can be produced by the Governance Platform 170, and an analyst can analyze the alert, and provide feedback as to a potential risk level of a party and/or transaction.

Governance Platform 170 can contain and call up one or more models to process and analyze the data and provide associated alerts for review by an analyst. The Governance Platform 170 in an embodiment can include a Risk-by-Association analyzer that provides instructions and logic for operating circuitry which can run a probabilistic risk model to generate a risk-by-association analysis scores. In an embodiment, another optional processing module stored at the associated computer memory 150, and in an aspect as part of the Governance Platform 170, is a pattern determination module or model that employs logic and instructions for detecting any data patterns indicative of suspicious activity or behavior in the transaction network that is indicative of criminal and/or fraudulent activity. Governance Platform/Module 170 can further include and invoke supervised (or unsupervised) machine learning (ML) techniques through, for example, ML Model 175, for detecting suspicious activity indicative of criminal activity, e.g., fraud, as known in the art, e.g., supervised learning using a regression model to predict a value of input data (classification) and unsupervised learning (clustering) techniques. Based on features and metadata relating to a party, transactions, environmental data, industry data, location data, other data, and changes to the data that are captured, techniques employing Hidden Markov Models or Artificial Neural Networks may alternatively or additionally be employed to compute a risk associated with a particular party, a transaction, and/or changes in data states.

In an embodiment, Governance Platform 170 includes an optional graph and build module/model 180, e.g., in memory 150, and provides instructions and logic for operating circuitry to form/build graphs, e.g., relationship networks, for use in producing alerts and accessing risk, and/or read data from graphs. Graph build module 180 is shown as included within the Governance Platform 170 but can be a separate module/model from the Governance Platform 170. Other modules or models can include rules model. Further details and explanation of the Governance Platform 170 is discussed below, and the Governance Platform 170 is not limited to the modules or models discussed above and any number of models can be used in the Governance Platform 170. In an aspect, the ingestion module 165 would load the received input data, the Governance Platform 170 determines from the input data, which may, for example, be party data, account data, transaction data, industry data, geographical data, and other data, including metadata, whether to issue an alert. In most instances, large amounts of data are input and processed by the data ingestion module 165.

Memory 150 optionally includes a supervisory program having instructions for configuring the computing system 100 to call one or more, and in an embodiment all, of the program modules and invoke the suspicious activity detection operations of the risk assessment tool 100. In an embodiment, the supervisory program calls methods and provides application program interfaces (APIs) for running Governance Platform 170 for generating SARs and/or alerts using the data ingested by the data ingestion module 165.

At least one application program interface (API) 195 is invoked in an embodiment to receive input data from an "analyst", e.g., a domain expert trained in finance/financial matters particularly in the context of detecting criminal and/or fraudulent activity. Via API 195, the analyst receives SARs and/or alerts. The analyst reviews the alert and in an embodiment can provide feedback information to either escalate or close the investigation of a particular party, transaction, etc. depending on the risk. Further investigation can lead to the issuance of a suspicious activity report (SAR).

Figure 2:
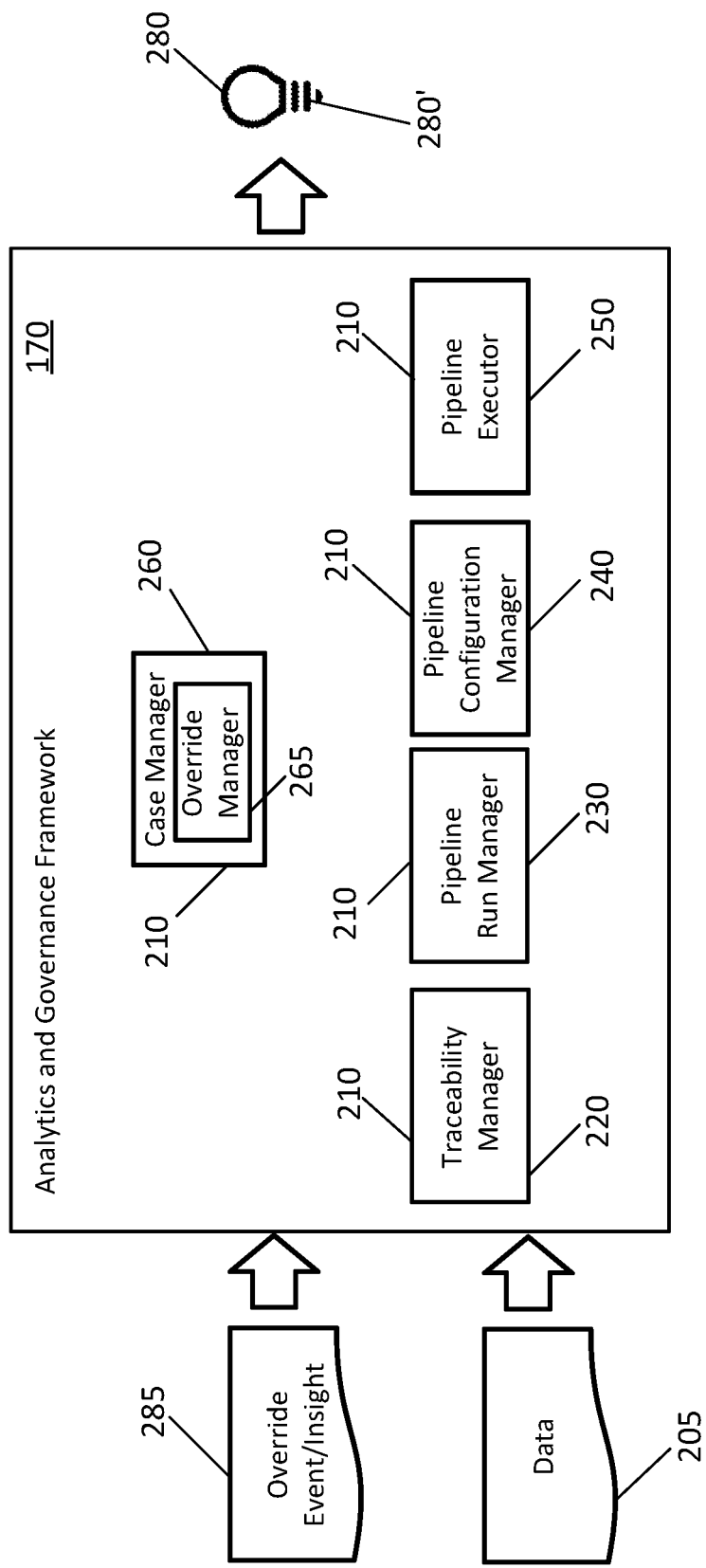
FIG. 2 schematically illustrates an overview of a system to run electronic data analytics programs to generate alerts to suspicious activity and to run an insight override in accordance with an embodiment of the present disclosure.

FIG. 2 discloses further details about the Governance Platform 170, sometimes also referred to as a system or governance framework 170, that is designed and configured to generate an alert, and as discussed in further detail later in the disclosure can further be configured to override and/or skip one or more insights and/or events on a more global level that are used to generate or arrive at alerts. For purposes of clarity FIG. 2 discloses functional units 210 for the system 170 while eliminating some of the details, specifics, and features disclosed in system 100 in FIG. 1. The functional units 210, and/or processing units associated with the functional units 210, contain instructions and/or logic for operating circuitry to perform the respective functions and operations of the functional units. For example, the functional units 210 contain instructions and/or logic executable by circuitry, for example in a processor, computer, server, etc, to perform one or more of the process steps performed by the functional unit. System 170 in an embodiment includes Traceability Manager 220, Pipeline Run Manager 230, Pipeline Configuration Manager 240, Pipeline Executor 250, and Case Manager 260. The Pipeline Executor 250 executes a given pipeline, including reading the pipeline configuration for a given pipeline and its version and executes the steps in the pipeline. Pipeline Manager 250 updates the execution pipeline run configuration and runs an Execution Pipeline 300 (See FIG. 3) task-by-task to generate and output alerts 280. Pipeline Configuration Manager 240 configures and maintains the Execution Pipeline 300 by, for example, determining what models to call, what data 205 to use, and how to use the data. The configuration can be captured in a table or as a JSON object. Pipeline Configuration Manager 240 maintains the revisions of the pipeline configurations such version, who modified/created, and when it was modified/created. Pipeline Configuration Manager 240 also maintains details of the pipeline such as input data, the pipeline flow, which filters are used and its versions, which transform functions are used and its versions, which models are used and its versions, which code/module are used and its versions. This information and data is used by the Pipeline Run Manager 230 to execute the different steps in the pipeline. The Pipeline Configuration Manager 240 also maintains the override flag against each model as discussed in more detail below.

The Pipeline Run Manager 230 maintains the run details, e.g., for each pipeline. The Pipeline Run Manager 230 manages and tracks what programs/models are run, including when and what is run each time a pipeline run is executed, such as when the pipeline run started and completed, the outcome or result of the run. The Pipeline Run Manager 230 knows the runtime information of any given pipeline and can be used to find which runs are impacted for a given change. The Traceability Manager 220 maintains the traceability of different artifacts in the system. The Traceability Manager 220 can help to identify the pipeline runs for a given alert by tracing the alerts and what models, programs, filters, data, transform functions, insights and/or events were used to generate the alerts 280. The Case Manager 260 in an embodiment is an application which is typically used by a user or analyst to review the alerts generated by the system. If the alert is suspicious enough, in an aspect it can be moved to an investigation queue, or if the alert is a false positive, the analyst or supervisor can close the case.

The system 170 uses the functional units 210 to prepare alerts 280 based upon data 205 ingested and/or received into the system 200. For example, the system 170 receives additional data on a periodic basis, such as for example every evening. The system 170 through input from an analyst or other user, or optionally as part of a program, selects programs or models to run in order to generate alerts 280. The system 170 to generate the alert 280 can take many forms and can have more or less functional units 210 than described in connection with FIG. 2. The system 170 can be run to generate alerts on a periodic basis, such as, for example at predetermined times, and/or manually by a user, immediately or any desired time.

Figure 3:
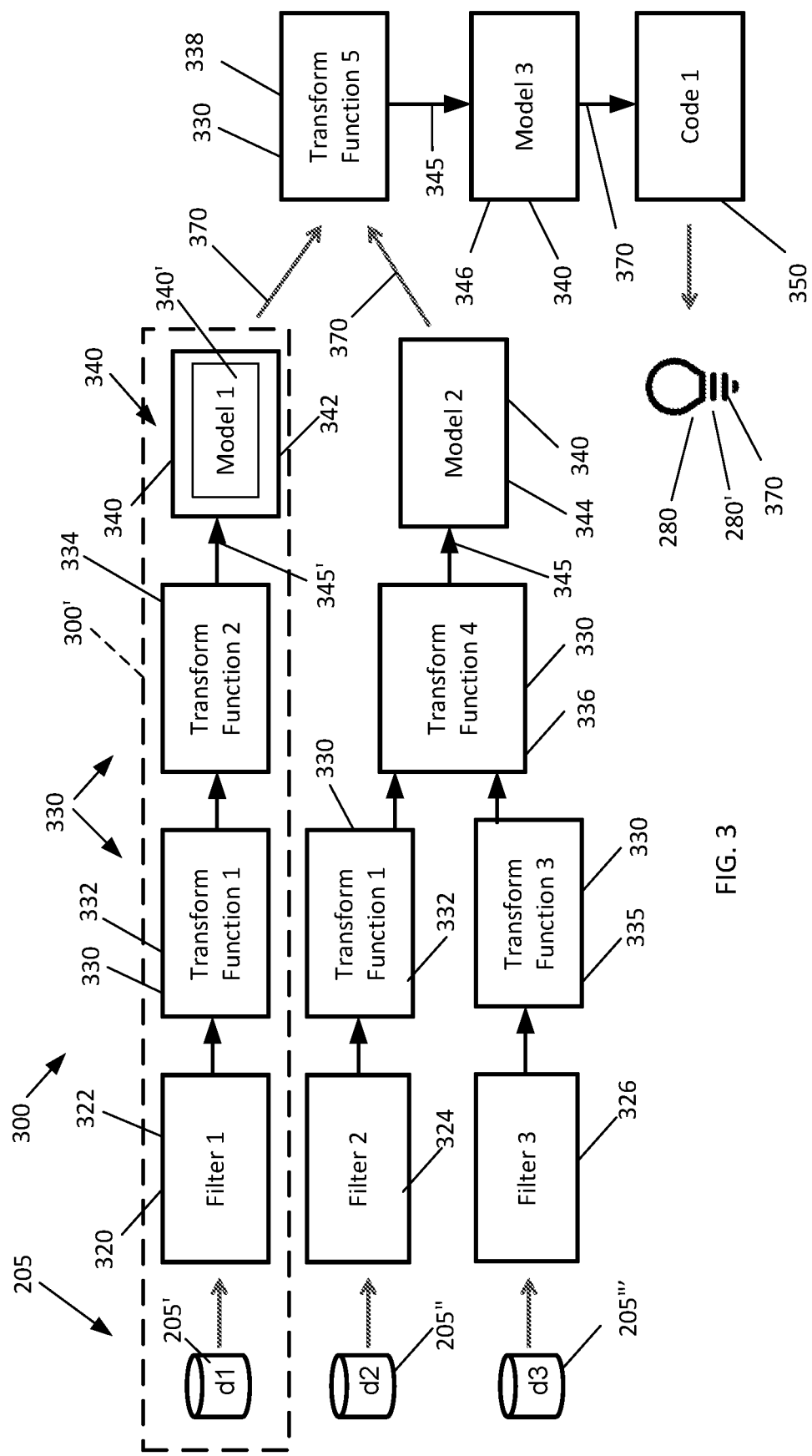
FIG. 3 illustrates a block diagram of a Suspicious Activity Detection execution pipeline implementing an insight override system and/or method according to an embodiment of the present disclosure.

FIG. 3 illustrates a suspicious activity (e.g., fraud detection) execution pipeline 300. Pipeline 300 in an embodiment includes receiving and/or ingesting data 205, illustrated as data subset 205' (d1), data subset 205'' (d2), and data subset 205''' (d3) in FIG. 3. It can be appreciated that the amount of data can and likely is much larger and numerous than the data 205 illustrated in FIG. 3. The execution pipeline can include one or more filters 320, one or more Transform Functions 330, one or more Models 340, and one or more Code Units 350 to process the data 205 and produce, generate, and/or output an Alert 280. The execution pipeline 300 illustrates a flow that takes data as an input and processes the data to generate an output.

Execution pipeline 300 includes one or more filters 320, illustrated as Filter 1 (322), Filter 2 (324), and Filter 3 (326) in FIG. 3, that are applied to the data 205, e.g., to data d1 (205'), data d2 (205''), and data d3 (205'''). Filters 320 process the data 205 or data subsets (e.g., 205'), for example, by filtering rows and columns, to obtain the desired data or data subsets in, for example, the desired format. Different filters 320 can be applied to different data 205 as shown in FIG. 3, the same filter 320 can be applied to different data, or the same filter 320 can be applied to different data. The execution pipeline 300 can apply one or more transform functions 330 which further process and transform the data. One example of a transformation function can be an "aggregate" function, which performs aggregate of the physical damages or injury bills against a particular claim. Another example can be a simple function which computes whether the loss date is a weekday or a weekend and whether during business hours or after business hours. In execution pipeline 300, the Transform Functions 330 are Transform Function 332 (Transform Function 1), Transform Function 334 (Transform Function 2), Transform Function 335 (Transform Function 3), Transform Function 336 (Transform Function 4), and Transform Function 338 (Transform Function 5). More or less Transform Functions 330 can be used in Execution Pipeline 300. Different incident models 340 can be applied in execution pipeline 300. The one or more filters 320 and one or more Transform Functions 330 generate one or more feature sets 345 that are input and/or submitted to the one or more models 340. The one or more features or feature sets 345 are data 205 that has been filtered, selected, and transformed into a form for use by the selected model 340. In other words, the various models 340 desire and/or require certain data in a certain format in order to run and generate an output. In execution pipeline 300, for example, the feature 345' (e.g., feature 1) output from Transform Function 334 is fed into Model 342 (Model 1).

The models 340, also referred to as programs 340, in one or more embodiments receive input as feature set 345 and will output or generate, depending upon the amount of processing performed by the model, insights 370, alerts 280, and/or values that can, for example, be further processed to create insights 370 or alerts 280. In an embodiment, the output from the Governance Platform 170 is an alert 280, and the alert 280 in one or more aspects is output directly from the one or more models 340. Additionally or alternatively, the output from the one or more models 340 can be one or more insights 370 that are used to generate one or more alerts 280. The models 340 can be, for example, a risk-by-association analyzer, a pattern determination model, a rules model, a machine learning model, etc. More or less models 340 are contemplated, and pipeline 300 is illustrated with three models 340, e.g., Model 342 (Model 1), Model 344 (Model 2) and Model 346 (Model 3).

In a further embodiment, the one or more models 340 can produce values used to replace variables in a narrative template to create insights 370, and/or values that can be used to generate an alert 280. That is, based upon the model output, the governance platform 170 (e.g., a Transform Function 330 and/or a further model 340) can replace the variables in a narrative and provide the resulting narrative as an insight 370. For example, after applying the one or more models 340 the data output from the model 340 may undergo further processing and manipulation by further transform function(s) 330, and by one or more models 340, to produce one or more insights 370. In one or more embodiments, because the model output is technical output and users of the system typically respond to text language, e.g., sentences, that they can understand, the model output can be run through a further optional Transform Function and/or a further model to construct a narrative referred to as an insight 370. In pipeline 300, for example, the output from Models 342 and 344 are received by Transform Function 338 which further processes the data for insertion into a narrative where the output from Transform Function 338 is received by Model 346 that inserts the values from Transform Function 338 into the narrative and Model 346 outputs one or more insights 370. As a further example, a model 342 returns two values [Cluster A, 10] where A is the cluster ID and 10 is the number of frauds in the cluster. Model 342 or another Model can place or substitute the values from model 342 into a narrative template to produce an insight 370. So where the narrative template is defined as "Party <party_id> is in Cluster <cluster id> which contains <Number_of-_fraud_parites> parties", the model 342 or another model will take the values and produce the insight, "Party A is in cluster A which contains 10 fraud parties" as an insight 370 output by model 342 or another model.

Optional Code 350 in pipeline 300 may be applied to further convert the data. For example, code 350 can be a look-up table to score the output of the case. Model 346 (Model 3) in pipeline 300 can output a numeric score or value and Code 1 350 can determine if the numerical score or value is above a threshold, and if so can generate or output an alert 280. It should be recognized that the output of the pipeline 300, or the model 340 may be in the form of "low" risk, "medium risk", or "high" risk, but it should be recognized that the output can be in other forms or formats. In one or more embodiments, input data 205 is fed into the governance platform 170, and in an embodiment into execution pipeline 300, where the input data 205 is converted into features 345 that are fed into one or more models 340 where in one or more aspects the one or more models 340 generate an output as one or more insights 370, and one or more insights are used to generate an alert 280.

It should be recognized that the Execution Pipeline 300 can include one or more execution pipelines, or sub-branches. For example, Filter 322 (Filter 1), Transform Function 332 (Transform Function 1), Transform Function 334 (Transform Function 2), and Model 342 (Model 1) illustrates execution pipeline 300'. Each pipeline can have different filters, different transform functions and/or different models, but can also share filters, transform functions, models, and data. For example, in the insurance industry, the Governance Platform can have an auto insurance pipeline, a worker's compensation pipeline, a property pipeline, and/or a medical provider pipeline, to name just a few. Each pipeline will take or use different data and process the data differently to identify potential suspicious activity. For example, the auto pipeline takes all auto insurance claims as input data and the worker's compensation pipeline is fed with worker's compensation claims.

The Pipeline Configuration Manager 240, based upon the user input or via the program, selects what models 340 and/or programs to call, what data or data subsets to use and how to use the data; the Pipeline Run Manager 230 manages and oversees the models and programs that are run; while the Pipeline Executor 250 runs the pipeline task-by-task to generate the alerts 280. The Traceability Manager 220 tracks and records how the alerts 280 were generated matching the alert 280 with, for example, the data 205, filters 320, models 340, insights 370, events, and transform functions 340 used to generate the alert 280 so that the alert 280 is traceable. For example, the Traceability Manager may have one or more tables identifying the various runs executed by the Governance Platform 170, the pipelines, and the data sets used.

Figure 4:
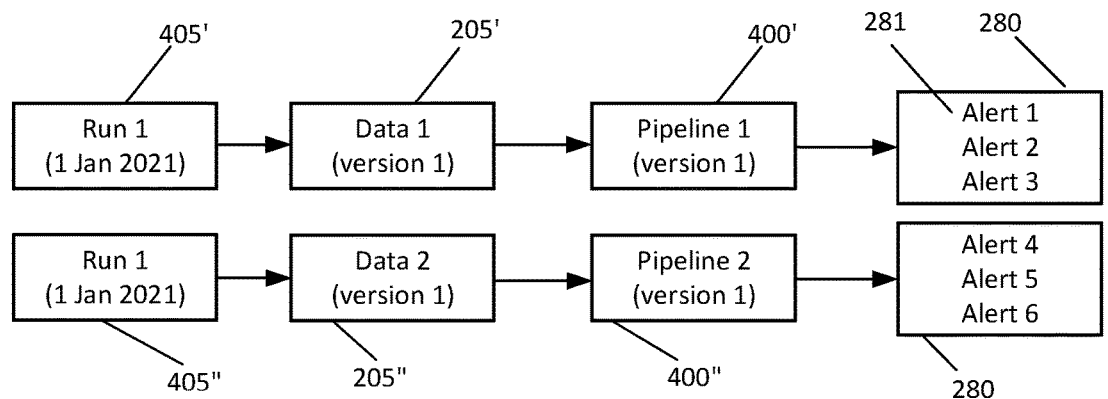
FIG. 4 illustrates a schematic block diagram of runs through the system and/or process to generate alerts to suspicious activity.
Figure 5:
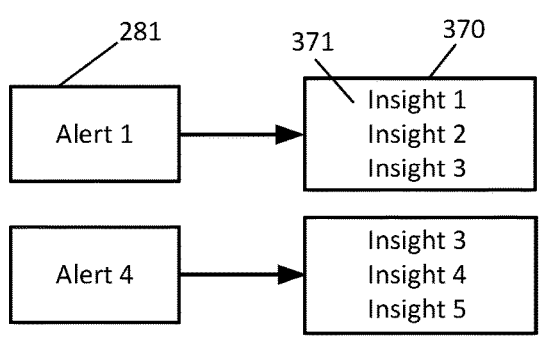
FIG. 5 diagrammatically illustrates that the alerts generated by the system and/or process in FIG. 4 are based upon insights.
Figure 6:
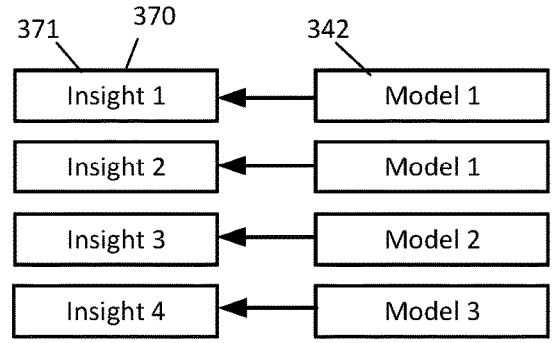
FIG. 6 diagrammatically illustrates that insights are generated by models.

FIGS. 4-6 illustrate schematic block diagrams of the system 170, e.g., Governance Platform, receiving or ingesting data 205, configuring and running various pipelines 400 and generating one or more example alerts 280, where the example alerts 280 were based upon example insights 370 that were generated or produced by example models 340. In the Governance Platform or system 170 there can be multiple pipelines, for example an auto insurance fraud pipeline, a property insurance fraud pipeline, a medical insurance fraud pipeline, etc., and so the pipelines can be identified and distinguished in the system. The various pipelines can be scheduled to run at set times, or they can be triggered manually to run as well. In one or more embodiments, each time a pipeline runs there will be a record created to capture that particular run of the pipeline. FIG. 4 is a schematic representation of data 250 being run through pipeline(s) 400 in the Governance Platform 170 to create one or more alerts 280. More specifically, FIG. 4 shows data 205' (Data 1v1) being processed by Pipeline 400' (Pipeline 1) and outputting Alerts 280 (Alerts 1-3) as Run 405' (Run 1 for pipeline 1), and data 205" (Data 2v1) being processed by Pipeline 400" (Pipeline 2) and outputting alerts 280 (Alerts 4-6) as Run 405" (also Run 1 for Pipeline 2). FIG. 5 is a schematic block diagram illustrating that Insight 1, Insight 2, and Insight 3 are the reasons that the system 170 generated Alert 1; while Insight 3, Insight 4, and Insight 5 are the reasons that the system 170 generated Alert 4. FIG. 6 is a schematic block diagram illustrating that Insight 1 is generated by Model 1, Insight 2 is generated by Model 1, Insight 3 is generated by Model 2, and Insight 4 is generated by Model 3.

Figure 7:
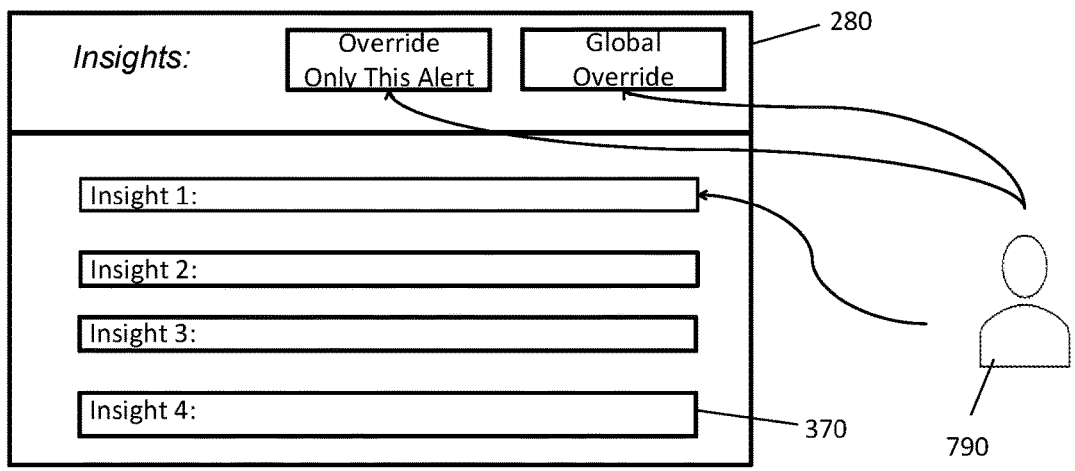
FIG. 7 schematically illustrates an overview of an insight override in accordance with an example of the present disclosure by a data analyst or supervisor overseeing an electronic data analytics program that generates alerts to suspicious activity.

An analyst typically reviews the alert 280 to determine how to proceed, and in particular typically reviews the insights 370 and/or events that lead to the alert being generated in the particular case in order to determine how to proceed. The alert 280 typically relies upon one or more insights 370, and the alert or report as shown in FIG. 7 is typically presented with the insights 370 which form the basis for the alert 280. For example, insight 1 could be that the average number of transactions has changed by twenty percent (20%); insight 2 could be that the customer is part of a high-risk cluster which has a number of known frauds; insight 3 could be that the transactions are associated with a high risk geographic zone; and insight 4 could be that there was extended inactivity in the account before the recent transactions. The system 170 for example can have a case manager 260 that contains the alerts and the user or analyst 790 opens the case manager program 260 and reviews the alerts 280. The analyst 790 reviews the alert 280 and determines how to proceed, including for example to close the alert if the alert is believed to be a false positive, or if it is believed that there is likely some fraud and needs further investigation the case can be escalated to "investigation". In instances the analyst can decide whether to bring the alert 280 to a supervisor or manager to determine what actions to take.

In an embodiment, the analyst may determine that an insight and/or event 370 that was used to develop the alert was misleading, irrelevant, and/or taken out of context, and that the event and/or insight should be overridden. It may be determined that the insight/event has been improperly used on multiple occasions and in multiple analyses, and that the insight/event 370 should be overridden on a global scale. That is, an end user or analyst 790 may see too many false positives if one or more models do not perform properly. These false positives can be local to certain cases or the false positives can be global and impact multiple or all cases.

A system, platform, and/or method is disclosed that in an embodiment permits an insight(s) and/or event(s), if found to be misleading and/or otherwise irrelevant for a given case (alert), to be overridden and to re-score the case (alert) by bypassing the misleading and/or irrelevant insight and/or event. In a further optional embodiment, if the insight(s) and/or event(s) is found to be misleading for several cases (alerts), then the system and/or method permits a user, preferably with higher level access like a supervisor, to be able to override or skip the misleading and/or irrelevant insight/event(s) for the alert scoring process and rescore the subset of cases (alerts) that previously had used the misleading or irrelevant insight/event(s).

As part of the review process, the analyst 790 as shown in FIG. 7 can decide to override one or more of the insights 370 and recalculate the data and re-score the alert 280 where one or more of the insights 370 are skipped, devalued, discounted, de-emphasized, ignored, and/or overridden. That is, the analyst or user can find that an insight 370 is misleading only in the context of a particular alert 280 and the user can chose to override the insight 370 only for that particular alert 280. For example, the analyst can decide to override insight 1 (e.g., that the average number of transactions changed by 20%) for that particular alert 280. The system 170 can rerun the execution pipeline generating a new alert 280' with insight 1 overridden. The analyst 790 could also determine that one or more insights 370 should be overridden, discounted, de-emphasized, ignored, and/or skipped globally. A user/analyst 790 may find that the insight 370 is misleading across different alerts indicating that it could be a global issue, and the user can chose to globally override the insight 370. That is, in one or more embodiments that particular insight 370 can be ignored when preparing certain alerts, multiple alerts, and/or all alerts 280. The analyst can bring the results, including the regenerated alert 280' and the original alert 280 to a supervisor/manager for review. In an embodiment, an analyst may be prohibited from overriding an insight 370 on a global scale and rather a supervisor with access to the system 170 and execution pipeline 300 at a higher privilege level may be required to skip or override the insight 370 on a global level.

Referring back to FIG. 2, the system or platform 170 for generating a revised alert 280' is disclosed. The revised alert 280' is prepared by overriding, discounting, skipping, or otherwise de-emphasizing one or more of the insights 370 upon which the original alert 280 was based includes. In one or more embodiments an Override Manager 265 is provided that oversees and manages the re-running of the process to regenerate the original alert or alerts 280 (also referred to as case or cases) without the misleading insight 370. In an aspect, the analyst 790 identifies and/or selects the insight 370 to be overridden and inputs and/or otherwise identifies the selected insight/event 370' for the platform 170. In an aspect, the Override Manager 265 receives the insight 370 selected and/or requested for override processing. During the re-run or re-scoring process, the system 170 in an embodiment identifies the task/model which generates the insight and overrides the value with a by-pass value that is used in recalculating the alert. In an aspect, the Pipeline Executor 250 and the Pipeline Configuration Manager 240 updates the pipeline run configuration to capture the override option, and in an embodiment executes the current case/alert, i.e., the case being re-scored, or subset of cases/alerts with an "override" flag for the selected insight 370 and/or model flagged for override.

FIGS. 8-11 show embodiments of how the system operates to override one or more insights in one or more alerts to recalculate and re-determine the alerts. FIGS. 8-11 correspond to the example system 170 run in FIGS. 4-6 that generated alerts 1-6. When overriding a particular oversight 370 the system identifies the model used to generate that insight. As shown in FIG. 4, pipeline 1 (400') generated Alert 1 (Alert 281) and as shown in FIG. 6, Insight 1(Insight 371) was generated by Model 1 (Model 342). The system 170 reviews the execution pipeline configuration and determines what pipeline generated the alert 281, and what model generated the insight 371. FIG. 8 shows that if a user selects Insight 1 (371) in Alert 1 (281) for override, then the system looks at the pipeline configuration and determines that Insight 1 (371) in Alert 1 (281) was generated by pipeline 1 (400') in run 1 (405') using data 1 (205') and that insight 1 was generated by Model 1 (342).

The table in FIG. 9 shows the different options that can be selected in the system to override insights in alerts. In FIG. 9, scenario 1, the user selects to override insight 1 just for Alert 1, and the system identifies that insight 1 in alert 1 was generated by pipeline 1 in run 1 using data 1, and the system filters the data for the claim at issue. In general terms, an alert is generated on a focal object, and in the insurance field the focal object is the claim, and in banking the focal object is either the party or the transaction, depending upon the solution. For example, in scenario 1, if run 1 used data 1 which has 1000 insurance claims, then the system needs to filter for the claim that raised the alert. So if the alert 1 is on claim 1, the system will identify that claim record and its associated data to be scoped for re-run of the pipeline to re-compute the scores after updating the execution pipeline to apply the override. In scenario 2 in the table of FIG. 9, if a user selects to override insight 1 for alerts 1-3, then the system identifies that insight 1 in alerts 1-3 was generated by run 1 in pipeline 1 using data 1. In scenario 3 in the table of FIG. 9, if a user selects to override insight 3 for all alerts, e.g., alerts 1-6 in the example diagrams, then the system identifies that insight 3 in all the alerts was generated in run 1 (405') in pipeline 1 (400') using data 1 (205') and was generated in run 1 (405") in pipeline 2 (400") using data 2 (205").

FIGS. 10-11 illustrate how the model in a pipeline and system generate an insight output in a normal run and in the situation where the model generating the insight output is overridden during execution, e.g., running, of the pipeline. FIG. 10 is a portion of pipeline 300 where feature 1 (345') is fed into Model 1 (342) and Model 1 (342) outputs insights 370, while FIG. 11 is the same portion of pipeline 300 where feature 1 (345') is fed into Model 1 (342) but Model 1 is set for override and Model 1 (342) in an embodiment outputs an override value 375 (which may be user selected or program selected) instead of insight 370. In FIG. 11 the override flag is set for Model 1 (342) and when re-running the pipeline 1 (Pipeline 400') that contains Model 1, the system will check if the override flag is set. The override flag is typically set to "false" by default. The pipeline configuration manager in an embodiment maintains the override flag for each model.

In one or more embodiments, if the override flag is set as in the example of FIG. 11, then the system in an embodiment will check for an override value 375 and will use the override value 375 instead of the model output. In another embodiment, if the override flag is set and no override value is provided, the system can enter a default value. If model 1 produces a one column output, then the override value will be a vector/array with a single element, and if the model produces for example five columns of output, then the override value will be a vector/array with five elements. In one or more embodiments, the override flag for the model is metadata and in an aspect is treated as an additional parameter supplied to the model. In an embodiment, the system will check the metadata and if the override flag is set to true, the system will look for and use the override value, will use a user selected value, or will use a default value.

Figure 12:
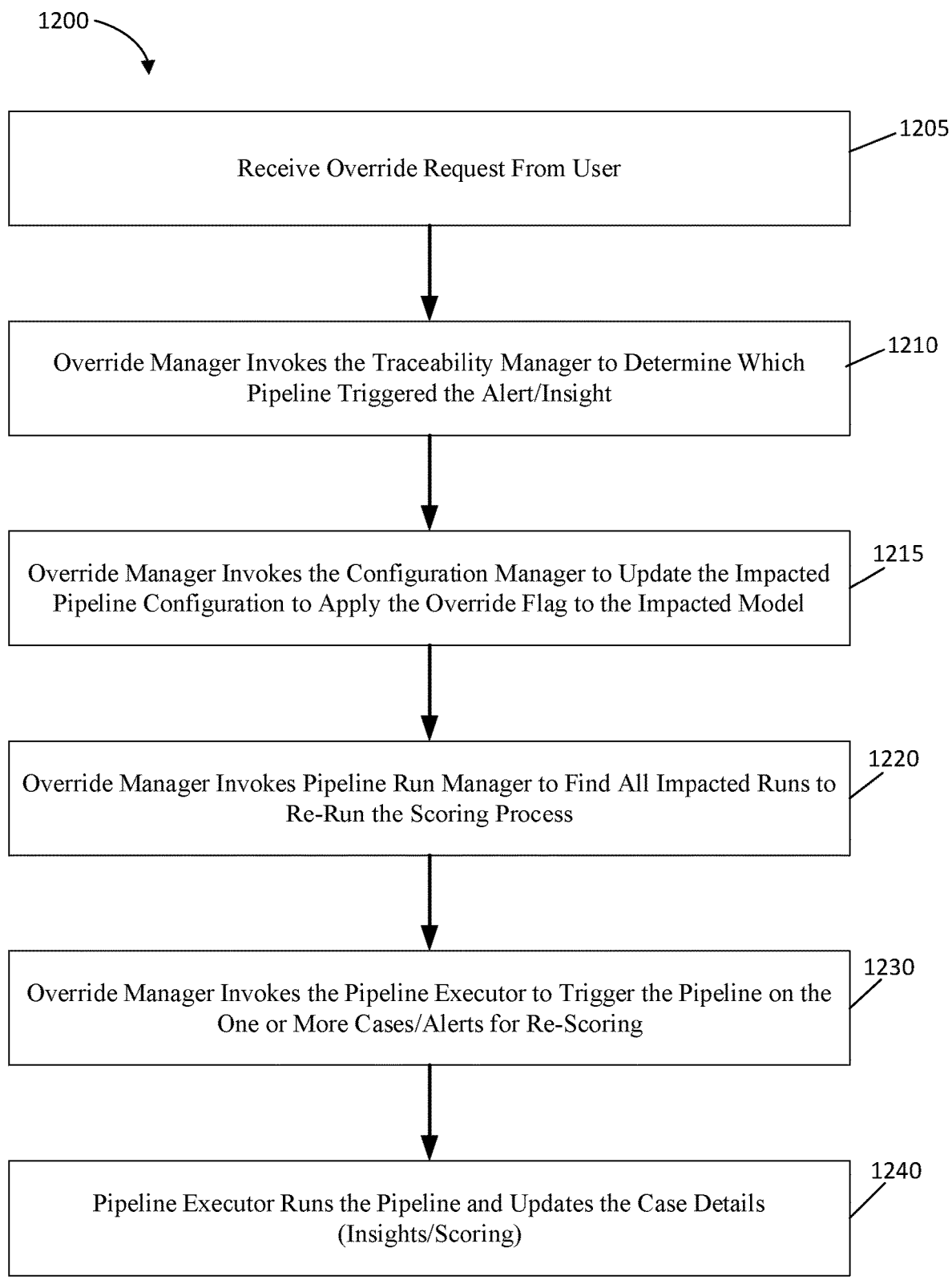
FIG. 12 illustrates a diagrammatic flowchart of a method of overriding an insight in an electronic data analytics suspicious activity detection system according to an embodiment of the present disclosure.

FIG. 12 is an exemplary flowchart in accordance with one embodiment illustrating and describing a method 1200 of overriding an insight and rescoring an alert generated by one or more insights/events. While the method 1200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 12, but the process may be integrated and/or one or more steps may be performed together, simultaneously, or the steps may be performed in the order disclosed or in an alternate order.

In one or more aspects, the method 1200 includes in an embodiment a system or platform for generating an alert regarding suspicious activity or behavior that may require additional analysis or review. The system or platform, also referred to as an Analytics and Governance Framework, e.g., platform/system 170, includes in an embodiment an Execution Pipeline, e.g., Execution pipeline 300, for generating an alert, and in an embodiment, an Override Manager for generating a re-scored, re-run, or re-generated alert. At 1205, in an embodiment a request to override one or more insight/events, e.g., override request(s), is received by a system or platform, e.g., system 170, in an aspect from a User. The insight override request, e.g., override request 285, in an embodiment is received by the Override Manager, e.g., Override Manager 265. The override request can take several forms, for example, a request can be received to override an insight used to arrive at or generate a single alert 280, to override an insight used to arrive at or generate multiple alerts 280, and/or to override an insight used to arrive at or generate all impacted alerts. For example, a request to override Insight 1 used to generate Alert 1 can be received by the system. In an aspect the override request can be initiated by a user in the Case Manager 260 and/or Oversight Manager 265.

At 1210, in an embodiment it is determined which execution pipeline triggered the particular alert report. In other words, at 1210 it is determined which execution pipeline was used to generate the insight that generated the particular alert report. More specifically, in an embodiment, at 1210, the Override Manager invokes the Traceability Manager to determine which execution pipeline triggered, e.g., was responsible for, the insight that generated the particular alert report at issue. In other words, at 1210, it is determined which pipeline triggered or utilized the insight that is to be overridden, e.g., the insight that is the subject of the override request. In one or more embodiments the Override Manager invokes the Traceability Manager to determine which pipeline had the insight that is to be overridden that formed the basis for the particular alert report at issue.

At 1215, it is determined which model generated the insight that is to be overridden and updates the configuration of the execution pipeline that contains the model to be overridden. In an embodiment an override flag is set and/or applied for the impacted model that is to be overridden. In an aspect the Override Manager invokes the Traceability Manager to identify the model that generated the insight to be overridden in the particular alert report or reports at issue. In an aspect, the Override Manager invokes the Configuration Manager to update the impacted execution pipeline to apply the override flag to the model that generated the insight/event to be overridden. In an aspect, the execution pipeline is updated to set an override flag for the model responsible for generating the insight upon which the particular alert or alerts was based, and in an aspect, setting the override flag can have the responsible, impacted model output an override value, a predetermined value, and/or a default value, and/or skip the impacted model when re-running the pipeline with the data that resulted in the insight and alert report or reports at issue.

At 1220 the pipeline runs that were used to generate the insight at issue (the insight the subject of the override request) in the one or more alerts at issue are identified. The Override Manager at 1220 invokes the Pipeline Run Manager to determine all the pipeline runs that were impacted by the insight that is to be overridden and used to generate the one or more alert reports at issue. So for example, in the first scenario of FIG. 9, the system finds that run 1 was used to generate the insight to be overridden in the one or more alerts at issue and is an impacted pipeline run, that data 1 was used to generate the insight to be overridden in the one or more alerts at issue and is impacted data. In the first scenario of FIG. 9 only one alert is at issue, so the data is filtered for the claim at issue.

At 1230 the updated execution pipeline is triggered to rerun the impacted pipeline runs to res-core the alert reports that relied upon the insight to be overridden. In an aspect, the Override Manager invokes the Pipeline Executor to rerun the one or more cases/alerts in the impacted pipeline for re-scoring. At 1240, the updated execution pipeline is re-run with the insight the subject of the override request overridden, ignored, or otherwise not considered to update the case/alert details, e.g., updates the insights and alert report scoring. In an embodiment the pipeline executor re-runs the impacted pipeline runs in the updated execution pipeline overriding the impacted models that generated the oversight that is the subject of the override request to re-score the one or more alert reports at issue. In an aspect, the Pipeline Executor re-runs the impacted pipeline runs that were identified using the updated execution pipeline with the identified impacted models being overridden, e.g., in an embodiment outputting an override value for the impacted model, to regenerate the one or more alerts at issue that relied upon the insight that was the subject of the override request. In an aspect, the system re-scores the claim at issue and re-generates the score for the impacted alert, by for example overriding the impacted models.

Referring to the system/platform 170 in FIG. 2 and the Suspicious Activity Execution Pipeline 300 in FIG. 3, the insight 370 to be overridden is submitted to System 170 as override request 285, and Override Manager 265 invokes the Traceability Manger 220 to determine which pipeline, e.g., pipeline 300', triggered the alert 280 that contains the insight 370 to be overridden. In this regard, the Traceability Manager 220 determines the Model 340 which contains the insight 370' selected to be overridden, shown in FIG. 3 as Model 1 and identified as 340'/342 (e.g., insight 1 in FIG. 6). The Override Manager 265 invokes the Pipeline Configuration Manger 240 to update the configuration of the impacted pipeline (e.g., pipeline 400') to apply an override flag to the impacted model 340'/342. The Override Manager 265 invokes the Pipeline Run Manger 230 to find all the impacted runs on the affected pipeline(s) using the model 340'/342 that contained the affected insight 370' to be overridden. The Override Manager 265 invokes the Pipeline Executor 250 to re-run the pipeline that contains the model 540' that contains the affected insight 370' to re-score the one or more affected cases/alerts 280 and the Pipeline Executor 250 runs the updated pipeline configuration (e.g., with the flagged impacted model revised to override the selected insight 270 and generates a new alert 280'.

Figure 13:
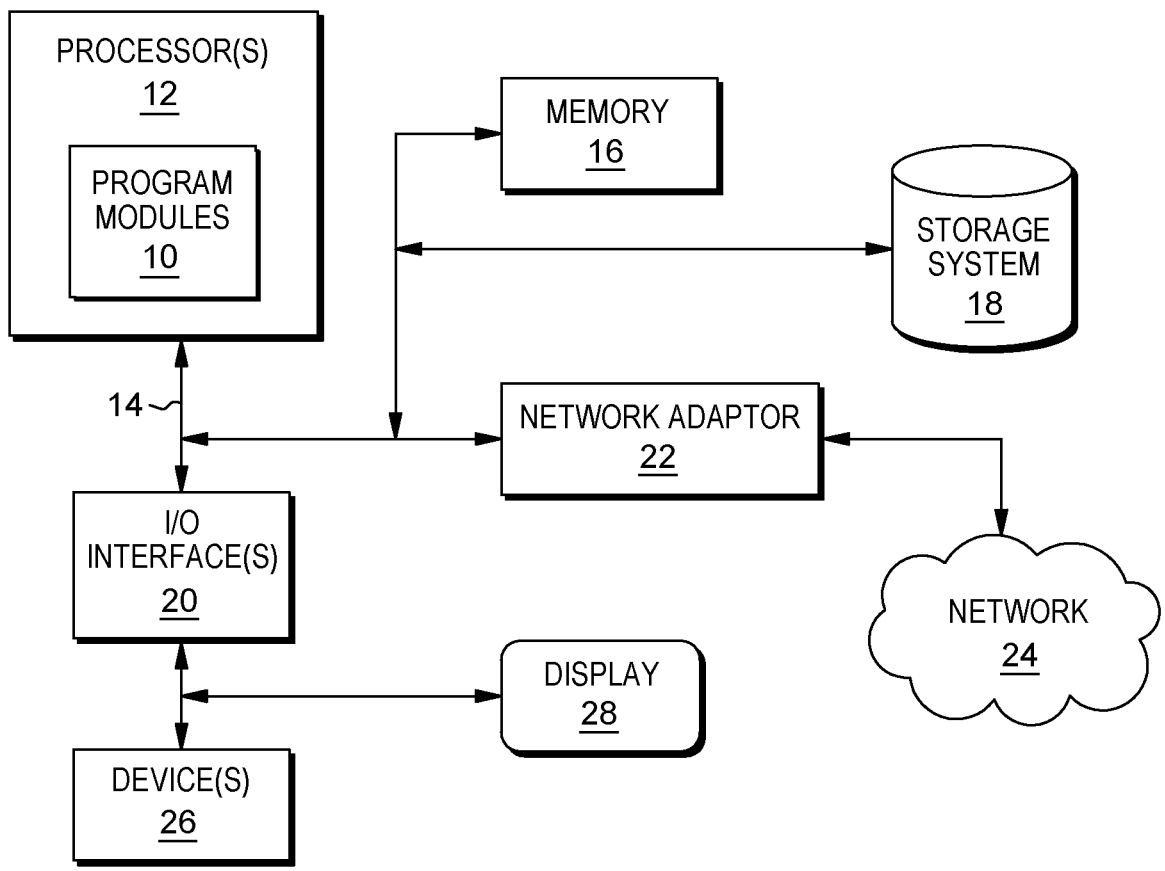
FIG. 13 illustrates yet another exemplary system in accordance with the present disclosure.

FIG. 13 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 13 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIGS. 2 & 3).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by the computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of re-running computer-generated alert reports indicative of excessive risk comprising:
receiving an override request to override an insight used to generate one or more computer-generated initial alert reports, wherein insights are generated by running one or more pipeline runs using at least one computer-implemented execution pipeline used to generate the alert reports and the insight that is the subject of the override request is at least one of an override group consisting of: overridden, skipped, ignored, devalued, discounted, de-emphasized, modified, changed, and combinations thereof,
wherein the computer-implemented execution pipeline comprises one or more computer-implemented data analytics models and at least one of a data preparation group consisting of data filters, transform functions, and combinations thereof that process electronic input data to create a feature set for use by the one or more computer-implemented data analytics models, and wherein the data filters process data to obtain the desired data in the desired format, the transform functions transform data to generate one or more feature sets, and the computer-implemented data analytics models comprises unsupervised machine learning models, and
further wherein the computer-implemented execution pipeline comprises the computer-implemented data analytics models and one or more of the data preparation group configured to create a flow of tasks that receives the electronic input data as input to the computer-implemented execution pipeline and processes the electronic input data to generate the alert reports and insights;
determining, in response to receiving a request to override an insight used to generate one or more computer-generated initial alert reports, one or more computer-implemented execution pipelines used to generate the one or more computer-generated initial alert reports that used the insight that is the subject of the override request;
determining, in response to receiving a request to override an insight used to generate one or more computer-generated initial alert reports, one or more impacted pipeline runs that were executed to generate the one or more computer-generated initial alert reports that used the insight that is the subject of the override request;
updating the one or more computer-implemented execution pipelines used to generate the one or more computer-generated initial alert reports, wherein updating the one or more computer-implemented execution pipelines comprises reconfiguring at least one of an update group consisting of: one or more of the data analytics models, one or more of the data preparation group, the flow of tasks, and combinations thereof, and wherein reconfiguring comprises at least one of a reconfiguring group consisting of overriding, skipping, ignoring, changing, modifying, devaluing, discounting, de-emphasizing, and combinations thereof; and
generating one or more new computer-generated alert reports, wherein generating one or more new computer-generated alert reports comprises re-running the one or more impacted pipeline runs using the one or more updated computer-implemented execution pipelines wherein the insight that is the subject of the override request is at least one of the override group.

2. The computer-implemented method according to claim 1, wherein an Override Manager receives from a user the override request and the Override Manager invokes a Traceability Manager to determine the one or more computer-implemented execution pipelines used to generate the one or more computer-generated initial alert reports.

3. The computer-implemented method of claim 1, wherein an Override Manager receives the override request and invokes a Pipeline Run Manager to determine the one or more impacted pipeline runs that were executed to generate and prepare the one or more computer-generated initial alert reports.

4. The computer-implemented method according to claim 1, wherein determining the one or more computer-implemented execution pipelines used to generate the one or more computer-generated initial alert reports comprises identifying one or more impacted data analytics models used to generate the insight that is the subject of the override request.

5. The computer-implemented method according to claim 1, wherein a Pipeline Configuration Manager updates the one or more computer-implemented execution pipelines used to generate and prepare the one or more computer-generated initial alert reports.

6. The computer-implemented method according to claim 1, further comprising identifying one or more impacted data analytics models used to generate the insight that is the subject of the override request, and
wherein updating the one or more computer-implemented execution pipelines used to generate and prepare the one or more computer-generated initial alert reports further comprises:
setting an override flag for the one or more impacted computer-implemented data analytics models used to generate the insight that is the subject of the override request and that was used in the one or more computer-implemented execution pipelines used to generate and prepare the one or more computer-generated initial alert reports.

7. The computer-implemented method according to claim 6, wherein, in response to setting an override flag for the one or more impacted computer-implemented data analytics models, an override value is output by at least one of the one or more impacted data analytics models when generating the one or more new computer-generated alert reports.

8. The computer-implemented method according to claim 1, wherein a Pipeline Run Manager identifies the one or more impacted pipeline runs that were executed to generate the one or more computer-generated initial alert reports that used the insight that is the subject of the override request.

9. The computer-implemented method according to claim 1, wherein a Pipeline Executor generates the one or more new computer-generated alert reports by re-running the one or more impacted pipeline runs using the one or more updated computer-implemented execution pipelines.

10. A computer-implemented method according to claim 1, further comprising:
receiving by a user a request to override an insight in each of a plurality of computer-generated initial alert reports;
determining one or more computer-implemented execution pipelines used to generate and prepare each of the plurality of computer-generated initial alert reports;
updating the one or more computer-implemented execution pipelines used to generate and prepare each of the plurality of computer-generated initial alert reports;

determining one or more impacted pipeline runs executed to generate and prepare each of the plurality of computer-generated initial alert reports that were based on the insight that is the subject of the override request; and generating a plurality of new alert reports, wherein generating the plurality of new computer-generated alert reports comprises re-running the one or more impacted pipeline runs using the one or more computer-implemented execution pipelines used to generate and prepare each of the plurality of computer-generated initial alert reports wherein the insight that is the subject of the override request is at least one of the group consisting of: overridden, skipped, ignored, devalued, discounted, de-emphasized, modified, changed and combinations thereof.

11. The computer-implemented method according to claim 10, wherein the request to override the insight used to generate and prepare each of the plurality of computer-generated initial alert reports can only be requested by a user having higher privilege authority than a user that made the request to override the insight used to generate and prepare each of the respective plurality of computer-generated initial alert reports.

12. The computer-implemented method according to claim 10, further comprising receiving a global request to override an insight used to generate and prepare every computer-generated initial alert report that used the insight.

13. The computer implemented method according to claim 10, further comprising identifying the one or more impacted computer-implemented data analytics models that were used in the one or more computer-implemented execution pipelines used to generate and prepare each of the plurality of computer-generated initial alert reports.

14. A computer-implemented system to re-run computer-generated alert reports indicative of excessive risk comprising:

a memory storage device storing program instructions; and a hardware processor having circuitry and logic to execute said program instructions to prepare the alert reports, the hardware processor coupled to said memory storage device and in response to executing said program instructions, is configured to:

receive, by an Override Manager in the computer implemented system, an override request to override an insight used to generate one or more computer-generated initial alert reports, wherein insights are generated by running one or more pipeline runs using at least one computer-implemented execution pipeline used to generate the alert reports and the insight that is the subject of the override request is at least one of an override group consisting of: overridden, skipped, ignored, devalued, discounted, de-emphasized, modified, changed, and combinations thereof, wherein the computer-implemented execution pipeline comprises one or more computer-implemented data analytics models and at least one of a data preparation group consisting of data filters, transform functions, and combinations thereof that process electronic input data to create a feature set for use by the one or more computer-implemented data analytics models, and wherein the data filters process data to obtain the desired data in the desired format, the transform functions transform data to generate one or more feature sets, and the computer-implemented data analytics models comprises-unsupervised machine learning models, and further wherein the computer-implemented execution pipeline comprises the computer-implemented data analytics models and one or more of the data preparation group configured to create a flow of tasks that receives the electronic input data as input to the computer-implemented execution pipeline and processes the electronic input data to generate the alert reports and insights;

determine, in response to receiving the request to override the insight used to generate the one or more computer-generated initial alert reports, one or more computer-implemented execution pipelines used to generate the one or more computer-generated initial alert reports that used the insight that is the subject of the override request, wherein determining the one or more computer-implemented execution pipelines used to generate the one or more computer-generated initial alert reports that used the insight that is the subject of the override request comprises identifying one or more impacted computer-implemented data analytics models used to generate the insight that is the subject of the override request;

update the one or more determined, computer-implemented, execution pipelines used to generate the one or more computer-generated initial alert reports, wherein updating the one or more determined, computer-implemented, execution pipelines used to generate the one or more computer-generated initial expert reports comprises reconfiguring at least one of an update group consisting of: one or more of the data analytics models, one or more of the data preparation group, the flow of tasks, and combinations thereof, and wherein reconfiguring comprises at least one of a reconfiguring group consisting of overriding, skipping, ignoring, changing, modifying, devaluing, discounting, de-emphasizing, and combinations thereof;

determine, in response to receiving the request to override the insight used to generate the one or more computer-generated initial alert reports, the one or more impacted pipeline runs that were executed to generate the one or more computer-generated initial alert reports that used the insight that is the subject of the override request; and generate one or more new computer-generated alert reports, wherein generating the one or more new computer-generated alert reports comprises re-running the one or more impacted pipeline runs using the one or more updated, determined, computer-implemented, execution pipelines wherein the one or more identified, impacted computer-implemented data analytics models used to generate the insight that is the subject of the override request are at least one of the override group.

15. The computer-implemented system according to claim 14, wherein the system comprises a Traceability Manager and wherein the hardware processor in response to executing said program instructions invokes the Traceability Manager to determine the one or more computer-implemented execution pipelines used to generate the one or more computer-generated initial alert reports.

16. The computer-implemented system according to claim 14, wherein the system comprises a Pipeline Configuration Manager and wherein the hardware processor in response to executing said program instructions invokes the Pipeline Configuration Manager to reconfigure the one or more computer-implemented execution pipelines used to generate the one or more computer-generated initial alert reports.

17. The computer-implemented system according to claim 14, wherein the hardware processor, in response to executing said program instructions, is further configured to:
   apply an override flag to the one or more impacted computer-implemented data analytics models used to generate the insight that is the subject of the override request and that was used in the one or more computer-implemented execution pipelines to generate the one or more computer-generated initial alert reports; and
   override, in response to applying an override flag to the one or more impacted computer-implemented data analytics models, the insight that is subject to the override request when generating the one or more new computer-generated alert reports.

18. The computer-implemented system according to claim 14, wherein the system comprises a Pipeline Run Manager and wherein the hardware processor in response to executing said program instructions invokes the Pipeline Run Manager to determine the one or more impacted pipeline runs that were executed to generate the one or more computer-generated initial alert reports that used the insight that is the subject of the override request.

19. The computer-implemented system according to claim 14, further comprising a Pipeline Executor, and wherein the hardware processor, in response to executing said program instructions, is configured to:
   receive, by a user, a request to override an insight used to generate a plurality of computer-generated initial alert reports;
   determine, in response to receiving the override request, the one or more computer-implemented execution pipelines used to generate and prepare each of the plurality of computer-generated initial alert reports;
   update the one or more determined computer-implemented execution pipelines used to generate each of the plurality of computer-generated initial alert reports;
   determine, in response to receiving the override request, one or more impacted pipeline runs executed to generate each of the plurality of computer-generated initial alert reports that were based on the insight that is the subject of the override request; and
   generate a plurality of new computer-generated alert reports, wherein generating the plurality of new computer-generated alert reports comprises re running the one or more impacted pipeline runs using the one or more updated computer-implemented execution pipelines used to generate and prepare each of the plurality of computer-generated initial alert reports wherein the one or more identified, impacted computer-implemented data analytics models used to generate the insight that is the subject of the override request are at least one of the override group.

20. A non-transitory computer readable medium comprising instructions that, when executed by at least one hardware processor, re-run one or more computer-generated alert reports indicative of excessive risk by configuring the at least one hardware processor to:
   receive a request to override an insight used to generate one or more computer-generated initial alert reports, wherein insights are generated by running one or more pipeline runs using at least one-computer-implemented execution pipeline used to generate the alert reports and the insight that is the subject of the override request is at least one of an override group consisting of: overridden, skipped, ignored, devalued, discounted, de-emphasized, modified, changed, and combinations thereof,
   wherein the computer-implemented execution pipeline comprises one or more computer-implemented data analytics models and at least one of a data preparation group consisting of data filters, transform functions, and combinations thereof that process electronic input data to create a feature set for use by the one or more computer-implemented data analytics models, and wherein the data filters process data to obtain the desired data in the desired format, the transform functions transform data to generate one or more feature sets, and the computer-implemented data analytics models comprises unsupervised machine learning models, and
   further wherein the computer-implemented execution pipeline comprises the computer-implemented data analytics models and one or more of the data preparation group configured to create a flow of tasks that receives the electronic input data as input to the computer-implemented execution pipeline and processes the electronic input data to generate the alert reports and insights;
   determine, in response to receiving the override request, one or more computer-implemented execution pipelines used to generate the one or more computer-generated initial alert reports, wherein determining the one or more computer-implemented execution pipelines used to generate the one or more computer-generated initial alert reports comprises identifying one or more impacted computer-implemented data analytics models used to generate the insight that is the subject of the override request;
   update the one or more computer-implemented execution pipelines used to generate the one or more computer-generated initial alert reports, wherein updating the one or more computer-implemented execution pipelines comprises reconfiguring at least one of an update group consisting of: one or more of the data analytics models, one or more of the data preparation group, the flow of tasks, and combinations thereof, and wherein reconfiguring comprises at least one of a reconfiguring group consisting of overriding, skipping, ignoring, changing, modifying, devaluing, discounting, de-emphasizing, and combinations thereof;
   determine, in response to receiving the override request, one or more impacted pipeline runs that were executed to generate the one or more computer-generated initial alert reports that used the insight that is the subject of the override request; and
   generate one or more new computer-generated alert reports, wherein generating the one or more new computer-generated alert reports comprises re running the one or more impacted pipeline runs using the one or more updated computer-implemented execution pipelines wherein the one or more identified, impacted computer-implemented data analytics models used to generate the insight that is the subject of the override request is at least one of the override group.

* * * * *